United States Patent
Patel et al.

(10) Patent No.: US 6,834,212 B1
(45) Date of Patent: Dec. 21, 2004

(54) METHOD AND APPARATUS FOR APC SOLVER ENGINE AND HEURISTIC

(75) Inventors: Sukesh Patel, Sunnyvale, CA (US); Mark Freeland, San Francisco, CA (US)

(73) Assignee: Blue Control Technologies, Inc., Burlingame, CA (US)

( * ) Notice: Subject to any disclaimer, the term of this patent is extended or adjusted under 35 U.S.C. 154(b) by 10 days.

(21) Appl. No.: 10/189,931

(22) Filed: Jul. 3, 2002

(51) Int. Cl.[7] .............................................. G06F 19/00
(52) U.S. Cl. ...................................... 700/121; 700/117
(58) Field of Search .............................. 700/121, 117, 700/103, 108, 109–110; 438/14, 16, 17

(56) References Cited

U.S. PATENT DOCUMENTS

| | | | |
|---|---|---|---|
| 5,926,690 A | * 7/1999 | Toprac et al. | 438/17 |
| 6,616,759 B2 | * 9/2003 | Tanaka et al. | 118/63 |
| 2002/0165636 A1 | * 11/2002 | Hasan | 700/121 |
| 2002/0193899 A1 | * 12/2002 | Shanmugasundram et al. | 700/108 |
| 2003/0176938 A1 | * 9/2003 | Tuszynski | 700/97 |
| 2003/0199108 A1 | * 10/2003 | Tanaka et al. | 438/14 |

* cited by examiner

*Primary Examiner*—Leo Picard
*Assistant Examiner*—Zoila E. Cabrera
(74) *Attorney, Agent, or Firm*—Amin & Turocy, LLP

(57) ABSTRACT

Systems and methodologies are provided that adapt and control desired fabrication processes by utilizing a control model based solution. A suitable control model is obtained or derived from one or more other control models. A formulaic description is then obtained that predicts one or more desired outputs based on various process settings and inputs. A suitable solution to the description that achieves the desired outputs and is relatively close to ideal processing conditions is obtained utilizing a heuristic. The solution includes process control parameters or settings that are employed to control and/or modify a fabrication process.

24 Claims, 10 Drawing Sheets

METHOD AND APPARATUS FOR APC SOLVER ENGINE AND HEURISTIC

TECHNICAL FIELD

The present invention relates generally to semiconductor fabrication, and more particularly to systems and methods for advanced process controls for semiconductor fabrication.

BACKGROUND OF THE INVENTION

As dimensions of semiconductor devices decrease, the available process window size decreases and manufacturing design rules shrink requiring tighter control over the manufacturing process. Generally, improvements in semiconductor fabrication processes and/or improvements in structural fabrication are required in order to further decrease critical dimensions and, thereby semiconductor devices. However, tighter control over the manufacturing process can be difficult to achieve, especially as critical dimension decrease further.

Semiconductor fabrication is a manufacturing process employed to create semiconductor devices in and on a wafer surface. Polished, blank wafers come into semiconductor fabrication, and exit with the surface covered with large numbers of semiconductor devices. The semiconductor fabrication includes a large number of steps and/or processes that control and build the devices. The basic processes utilized are layering, patterning, doping and heat treatments. Layering is an operation that adds thin layers to the wafer surface. Layers can be, for example, insulators, semiconductors and/or conductors and are grown or deposited via a variety of processes. Some common deposition techniques are chemical vapor deposition (CVD), evaporation and sputtering. Patterning is a series of steps that results in the removal of selected portions of surface layers. After removal, a pattern of the layer is left on the wafer surface. The material removed can be, for example, in the form of a hole in the layer or a remaining island of the material. The patterning transfer process is also referred to as photomasking, masking, photolithography or microlithography. The actual subtractive patterning, e.g. removal of material from the surface film, is done by plasma etching. The goal of the patterning process is to create desired shapes in desired dimensions (e.g., feature size) as required by a circuit design and to locate them in their proper location on the wafer surface. Patterning is generally considered the most important of the four basic processes. Doping is the process that adds specific amounts of dopants to the wafer surface. The dopants can cause the properties of layers to be modified (e.g., change a semiconductor to a conductor). A number of techniques, such as thermal diffusion and ion implantation can be employed for doping. Heat treatments are another basic operation in which a wafer is heated and cooled to achieve specific results. Typically, in heat treatment operations, no additional material is added or removed from the wafer, although contaminates and vapors may evaporate from the wafer. One common heat treatment is called annealing, which repairs damage to crystal structure of a wafer/device generally caused by doping operations. Other heat treatments, such as alloying and driving of solvents, are also employed in semiconductor fabrication.

Processes employed in semiconductor fabrication typically employ a significant number of variables. A process can, for example, utilize one or more flow rates, composition ratios, temperature, pressure, spin rate, time and the like. Additionally, these variables are generally subject to processing constraints that are employed to reduce or prevent damage to the wafer and/or semiconductor device. Constraints may also be employed to ensure the creation and/or maintenance of desirable device characteristics (e.g., fast switching speeds, low leakage current, etc.) For example, an exemplary constraint could be that oxygen flow must be greater than 15 sccm and less than 20 sccm or that a $CHF_3/CF_4$ ratio not to exceed 20. Because of the number of variables involved, the constraints on those variables, and the desire to create favorable device characteristics while suppressing undesirable device characteristics, it can be difficult to control the manufacturing process let alone maximize the benefits of the manufacturing process. It has been empirically observed that controlling the manufacturing process becomes even more challenging as smaller and smaller devices need to be fabricated. The control of fabrication processes can be improved via feed forward and feedback control techniques that use in situ (or in-line) data to improve the results of the process. These techniques are known as "Advanced Process Control" techniques and typically work by building a predictive model of the manufacturing fabrication process. The predictive model is able to "predict" the outcome (e.g., values for one or more device characteristics) of the manufacturing process given the state of process variables and applicable constraints. One can invert the usage of the predictive model by using a value for a desired outcome and then "solving" the predictive model to identify the required state of process variables.

Fabrication processes that are modeled with only one or two variables can generally be "solved" fairly easily. The "Solved" means finding and/or assigning values to these variables that produce desired results (e.g., dimensions, locations, doping concentrations . . . ). These one or two variable process models can typically be quickly solved as linear or quadratic problems. However, more complex process models that utilize a higher number of variables are more difficult to solve. Additionally, such process models are often nonlinear further increasing the difficulty of solving the models. Accordingly, these more complex process models require relatively large amounts of computational power to obtain a solution that substantially meets all goals and constraints. Additionally, these non-linear models can be unsolvable (e.g., a solution that satisfies the goal and all applicable constraints cannot be achieved in finite time using finite computational resources). Thus, obtaining solutions for complex process model (e.g., containing a large numbers of variables) are unobtainable or computationally expensive to solve and can preclude identifying solutions in real time.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention can facilitate improvements in semiconductor fabrication processes by permitting tighter control over the manufacturing process. Feed back and feed forward techniques can be employed to improve a fabrication process by reducing variations in the process output. Improved or tighter control of the fabrication process can result in the following benefits: a) better device characteristics; b) improved device performance; and/or c) improved device yield. Collectively these benefits improve device yield and/or produce devices with additional intrinsic value (erg., better performance, lower heat dissipation, lowered leakage current). Furthermore, the present invention serves to facilitate substantially automating all or a portion of semiconductor device fabrication. Fabrication processes can be initiated remotely or locally by sending directives. Additionally, the fabrication processes are dynamically adapted in real time to account for variations in expected inputs and/or outputs.

The invention adapts and controls a desired fabrication process by utilizing a control model. A suitable control model is obtained or derived from one or more other control models. This is said to be an "instantiated" model, viz. a model associated with a particular tool recipe (description of settings such as power, time, etc.), specified with sufficient detail so as to be capable of predicting outputs for a set of input values.

A formulaic description is then obtained and/or generated that predicts one or more desired outputs based on various process settings, process inputs, and measurements (e.g., process or device). A suitable solution to the formulaic description that achieves the desired outputs and is relatively close to ideal processing conditions is obtained utilizing a heuristic. The solution includes process parameters or settings that are employed to dynamically control and/or modify a fabrication process.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
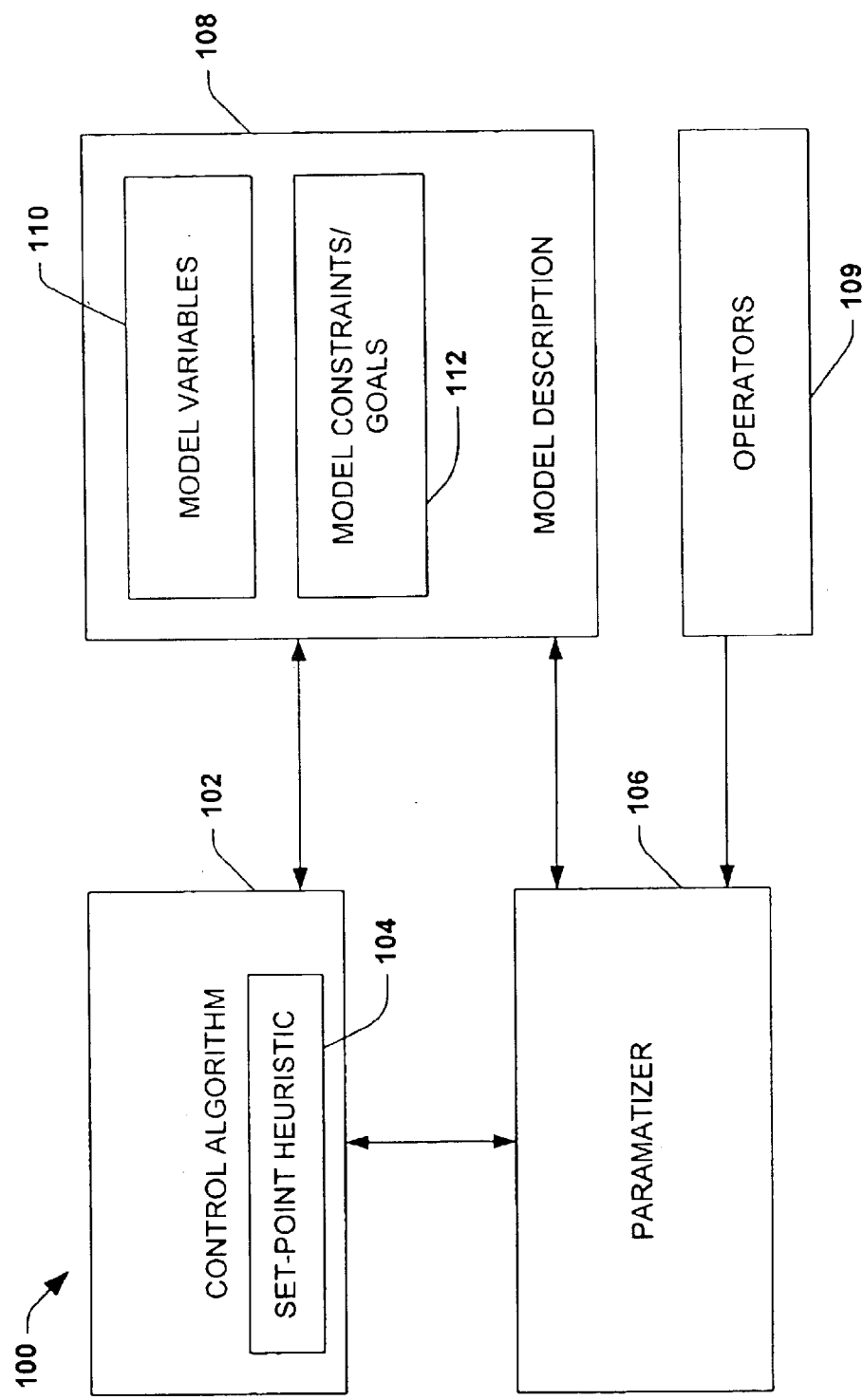
FIG. 1 is a block diagram illustrating a system that facilitates solving control models in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention facilitates improvements in semiconductor fabrication by permitting tighter control over the manufacturing process. The invention can utilize feed back and feed forward techniques to reduce variations in the process output. Improved or tighter control of the fabrication process can result in the benefits such as, but not limited to the following: a) better device characteristics; b) improved device performance; and/or c) improved device yield. Collectively these benefits improve device yield and/or produce devices with additional intrinsic value (e.g., better performance, lower heat dissipation, lowered leakage current).

Turning now to FIG. 1, a block diagram of a system 100 that facilitates solving control models in accordance with an aspect of the present invention is depicted. The system 100 generates a solution (e.g., model input values) given a control model and a recipe set-point for a desired fabrication process. The control model is an abstraction and/or simulation of actual processing parameters and conditions and predicts outputs based on settings and inputs. The recipe set-point is an ideal state (e.g., set of ideal processing parameter values and conditions) and is generally obtained from a semiconductor fabrication design process. The system 100 includes a control algorithm 102, a paramatizer 106, a model description 108, and an operators component 109. Additionally, the control algorithm 102 includes a set-point heuristic 104 and the model description 108 includes model variables 110 and model constraints 112. The paramatizer 106 also receives various applicable operators from the operators component 109.

The paramatizer 106 provides a mechanism whereby model variables, model constraints, model goals, and operator descriptions can be translated and expressed in internal representation structures that can be processed by the control algorithm 100. The paramatizer also creates the notion of an "ideal state" based on a description of the recipe set-point received from the model variables component 110. This ideal state is then passed to the control algorithm in a representation structure that can be understood by the control algorithm 102.

The control algorithm 102 interacts with the paramatizer 106 and the model description 108 to obtain a solution. The solution is a set of processing parameter values relatively close or substantially close in terms of distance to the recipe set-point that meet or exceed one or more goals (e.g., desired isotropic etch rate, desired thickness, desired width and the like). The model description 108 generally, provides a mathematical description of a semiconductor device and one or more fabrication processes. The description typically includes a vector of outputs, a vector of inputs and a vector of desired settings. The model outputs are essentially predictions based on the inputs, and settings. As stated above, the model description 108 includes the model variables 110, which can be inputs, outputs and/or settings. The model variables 110 include variables such as oxygen flow, pressure, power bias and the like as well as other measurement based inputs like oxide thickness, current photo-resist line width, etc. . . ., and outputs like anisotropic etch rate, post-etch microloading, etc. The model input variables generally affect processing conditions (model output variables) such as etch rates (e.g., isotropic and/or anisotropic), doping concentrations, layer thickness and the like. Additionally, the model description 108 includes the model constraints and model goals 112. The model constraints 112 are limits or conditions placed on the model variables 110. Generally, the model constraints 112 are obtained during semiconductor fabrication designing and serve to reduce damage to devices being fabricated. They may also represent limitations on the capability or desired operation of the process tool. For example, a typical model constraint can be that oxygen flow is to be greater than 10 sccm and less than 20 sccm or that the ratio of $CHF_3/CF_4$ should be below 2. Also, the model constraints 112 can include constraints which are desirable, but not necessarily required. For example, a constraint can be that oxygen flow is should desirably be greater than 15 sccm and less than 18 sccm or that the etch rate should be less than 0.020935 nm/s. Model goals capture some desirable outcome or target of the fabrication process. An exemplary model goal can be that the output gate line width be 100 nm with a maximum variation of +/-2 nm.

The model description 108 can be a composite of one or more control models that relate to a desired fabrication process. That is, it can consist of multiple instantiated models that apply over different ranges of input and setting values. Alternately, the model description 108 can be built, at least partially, from one or more control models that relate to a desired fabrication process along with additional information.

The paramatizer 106 processes and translates the model variables 110 and the model constraints 112 from the model description 108 and provides them and/or other information to the control algorithm 102. The paramatizer 106 is operative to identify interdependencies between variables and constraints and to generate and/or develop formulaic descriptions or predictions of their behavior. For example, the paramatizer 106 can combine variables and constraints for horizontal etching and vertical etching into a single formulaic description, which is then presented to the control algorithm. Additionally, the paramatizer 106 can enable the control algorithm 102 to obtain variable manipulation operators (e.g., incremental operator for oxygen flow) from the operators component 109. The operators obtained from 109 are used by the control algorithm 102 to systematically generate values for the model variables. The control algorithm 102 employs a set-point heuristic 104 to generate a solution for the model formulaic descriptions. The set-point heuristic 104 starts with a recipe set-point. The recipe set-point is then the initial as well as the "ideal state" where a state is a set of values associated with variables. If a solution is not obtained at the recipe set-point, the heuristic 104 expands a radial distance away from the set-point to obtain a locus or set of ordered potential points within a radial distance from the set-point. The potential solutions or points can also be referred to as states. Then, the set-point heuristic 104 tests the closest point in terms of distance from the recipe set-point to determine whether the closest point is an acceptable solution. If it is not, the next closest point of the set of potential solutions is analyzed. If the set of potential solutions or points is analyzed without finding a solution, the heuristic once again expands an additional distance from the set-point so as to obtain a new set of potential solutions or points. The new set of potential solutions or points is analyzed in a similar fashion as the first set of potential solutions or points. The set-point heuristic 104 continues until a solution is obtained. Once obtained, the solution (e.g., values of settings for the model variables 110) can be employed for a related fabrication process.

Determining the distance from the recipe set-point for a new set of potential solutions is an important computation and is generally computed so as to obtain a set of potential solutions that can be analyzed in real time. Clearly, generating too large a set of potential solution could significantly reduce the speed of the heuristic. Settings for some of the variables in the model are typically constrained (e.g., a specified flow rate must be less than 10 sccm). Acceptable ranges can then be determined for the settings so long as they are in accordance with the constraints. Additionally, increments and decrements (e.g., 0.05 sccm) are also obtained via a method such as scaling. For example, if the acceptable range of a particular setting is 5 to 25 and a 100 possible values are desired, the range can be divided by the possible values desired to obtain an increment and/or decrement value (e.g., 0.2 for this example). It is appreciated that some of the settings can be static or un-modifiable due to constraints (e.g., a required pressure of 25 mTorr). Other suitable methods can be employed to generate acceptable ranges, increments and decrements and still be in accordance with the present invention. For example, the available precision of control for a specific variable may be in 1 mA, thus if the tool specific range for the current is 20 to 100 mA, potential settings for the current must be an integer mA between 20 and 100 inclusive. Furthermore, the paramatizer 106 can be operative to perform these computations with the help of suitable operators obtained from 109. Then, the distance can be determined by, for example, by incrementing or decrementing the various settings by a factor of one.

Figure 2:
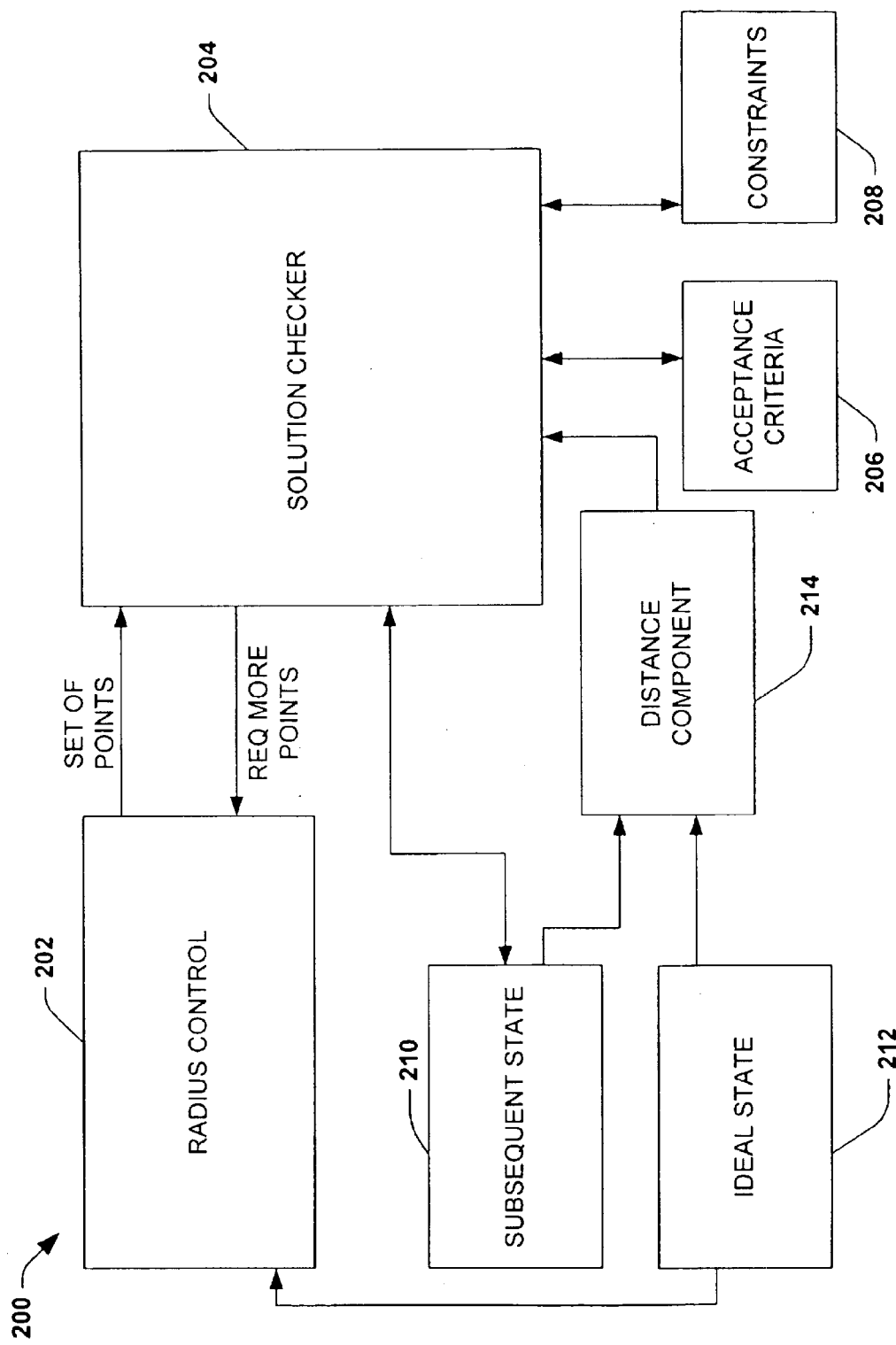
FIG. 2 is a block diagram illustrating a system that facilitates providing control model based solutions in accordance with the present invention.

FIG. 2 is a block diagram of a system 200 that facilitates providing control model solutions that are relatively close to a recipe set-point in accordance with an aspect of the present invention. The system 200 employs a version of a hill climbing weak algorithm, also referred to as a set-point heuristic, to obtain solution(s). It is to be appreciated that a variety of algorithms (e.g., nearest neighbor, k nearest neighbor (KNN), greedy search) may be employed in connection with various aspects of the present invention. The system 200 can be utilized by a component or system such as, for example, the control algorithm 102 of FIG. 1. The system 200 includes a radius control 202, a solution checker 204, acceptance criteria 206, constraints 208, a subsequent state 210, an ideal state 212 and a distance component 214. The obtained solution, which includes settings for various inputs, substantially satisfies the acceptance criteria 206 and the model constraints 208, and is, distance wise, close to the ideal state 212.

The radius control 202 is operative to determine and/or generate a locus or set of potential solution points with respect to a recipe set-point to be considered. As stated above, the recipe set-point is a set of inputs and recommended settings that is generally obtained as a result of a fabrication design process. The recipe set-point is modeled by the ideal state 212. The radius control 202 can utilize a number of suitable methods for obtaining the set of potential solution points. One method that can be employed is to first determine acceptable ranges of settings for the input variables. Then, incremental values for the settings are computed according to the acceptable ranges of settings subject to precision and accuracy constraints imposed by the fabrication tools. Subsequently, the set of potential solution points can be obtained by adjusting each setting by a factor of n, where n is a distance. As an example, consider three input variables a, b and c that have acceptable ranges of 30–40, 60–70 and 220–240, respectively and incremental values of 0.5, 0.5 and 1 respectively. Table 1, below illustrates a portion of an exemplary set of potential solution points for a distance or factor of 1 and a set-point of 35, 65 and 230.

TABLE 1

|  | a | b | c |
|---|---|---|---|
| Set-point | 35 | 65 | 230 |
| Possible Solution$_1$ | 34.5 | 64.5 | 229 |
| Possible Solution$_2$ | 34.5 | 65.5 | 231 |
| Possible Solution$_3$ | 34.5 | 64.5 | 231 |
| Possible Solution$_4$ | 34.5 | 65.5 | 229 |
| Possible Solution$_5$ | 35.5 | 64.5 | 229 |
| Possible Solution$_6$ | 35.5 | 65.5 | 231 |
| Possible Solution$_7$ | 35.5 | 64.5 | 231 |
| Possible Solution$_8$ | 35.5 | 65.5 | 229 |

It is appreciated that the information depicted in Table 1 is exemplary only and greatly simplified for illustrative purposes only. The present invention is not intended to be limited to or by the example described and can include suitable numbers of variables and corresponding settings as well as suitable and varied ranges for the settings.

The radius control 202 initially provides a set of potential solution points comprising only the ideal state, but can repeatedly be called to generate additional and typically larger sets of potential solution points by systematically modifying (expanding or decreasing) the radius.

The solution checker 204 is operative to test that a potential solution satisfies the acceptance criteria 206, which provides values or encoded values for variables that satisfy the control model, and the constraints 208. The solution checker 204 tests the set of potential solution points in an incremental fashion and in order according to distance from the ideal state 212. The distance component 214 is employed to compute a distance, respectively, for the set of potential solution points to the ideal state 212. Additionally, the distance component 214 can be employed by the radius control 202 to facilitate generation the set of potential solution points. The distance can be computed for a respective solution point by taking the square root of the result of squaring the difference of each setting or value of the respective solution point and the ideal state 202 and summing the squares. Other suitable distance computations can be employed and still be in accordance with the present invention.

The solution checker 204 individually analyzes the set of potential solution points. A current point to be analyzed is represented by the subsequent state 210. The subsequent state is analyzed to determine if it is or is not a viable solution (e.g., satisfies the requirements of the acceptance criteria 206 including the constraints 208). If the subsequent state 210 is not a viable solution, another or next remaining point of the set of potential solution points is utilized as the subsequent state 210. Note that subsequent states are ordered by distance from ideal state. Thus states closer to the ideal state are checked by the solution checker 204 before points that are farther away from the ideal state. Additionally, if there are no remaining points in the set of potential solution points (e.g., the points in the set have been analyzed and identified as not viable solutions), a request for additional potential solution points is made to the radius control 202. The additional solution points are then analyzed to obtain a solution. This process can be iteratively repeated to obtain a solution (e.g., requesting additional points, increasing radial distance, generating new set and individually analyzing the set). On obtaining a solution, the solution checker 204 can provide the solution point, including process parameter values e.g., the input variables, settings, output variables and other information) to a fabrication controller or process tool (not shown).

It is appreciated that the system 200 can be employed during a fabrication process to suggest modifications to the process parameters. Feedback information can be received that modifies functional relationships between input variables, settings and output variables. Then, a new solution (e.g., set of new process parameter values) can be obtained in accordance with the updated/modified functional relationship.

Figure 3:
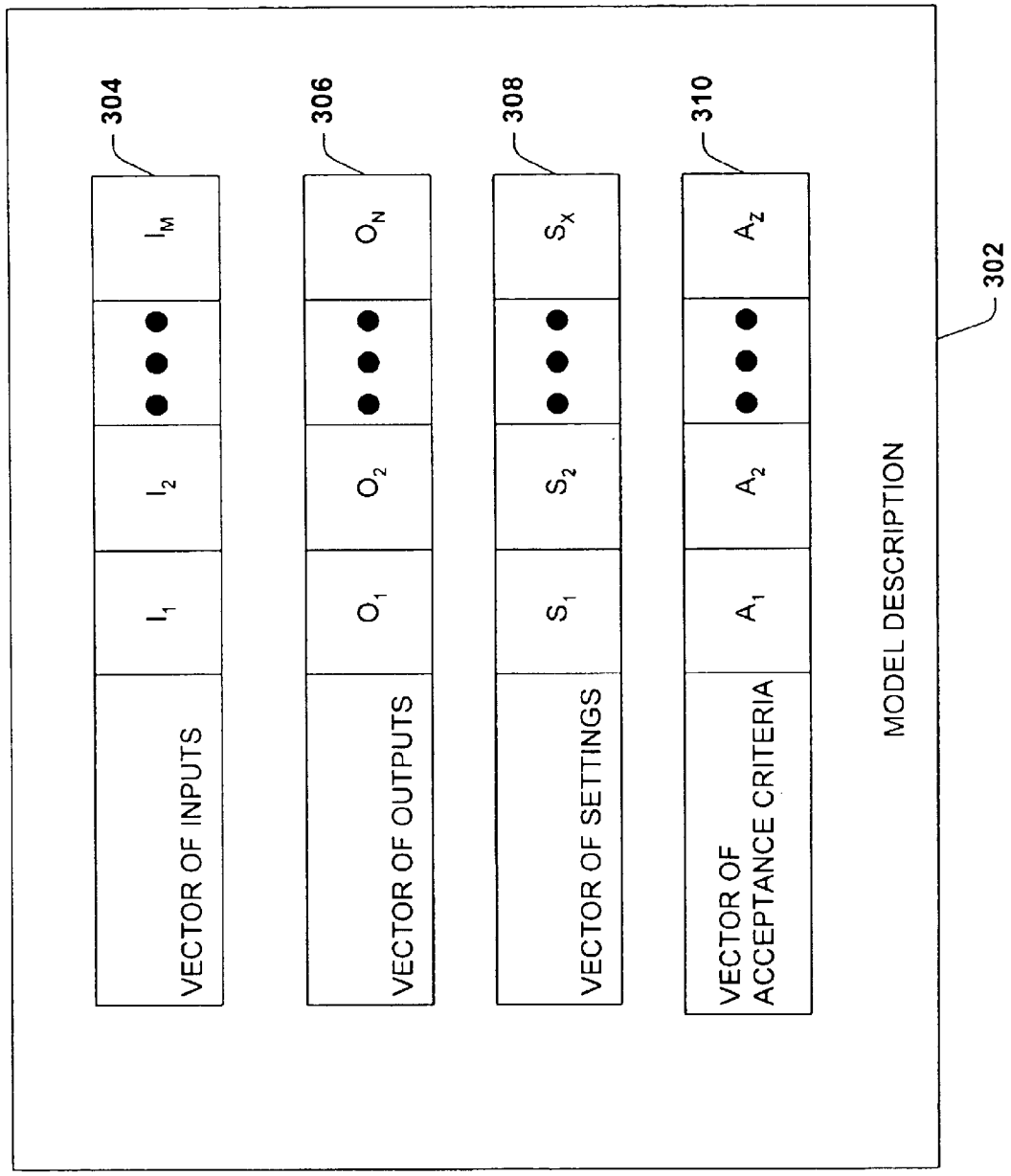
FIG. 3 is a block diagram illustrating a model description in accordance with an aspect of the invention.

Turning now to FIG. 3, a block diagram of a model description 302 in accordance with an aspect of the present invention is depicted. The model description 302 facilitates semiconductor fabrication by permitting solutions, obtainable by the present invention that reduce variations in process outputs. Additionally, the model description 302 mathematically models one or more stages of a semiconductor fabrication process. The model description 302 includes a vector of inputs 304, a vector of outputs 306, a vector of settings 308, and a vector of acceptance criteria 310 including constraints.

The model description 302 is initially developed utilizing suitable predictions and can also include training data for a similar fabrication process and/or device. Training data can be generated and employed to further improve the accuracy of the model description 302. Additionally, the model description 302 can be updated during and/or after fabrication processes according to actual results encountered.

The vector of inputs 304 also includes, but is not restricted to, process status variables, device measurements, operating state or condition measurements, estimates for measurements or status variables, or other man-machine provided inputs as required by the control model. Some examples of input variables are, number of chamber RF hours, current poly-gate profile measurements or estimates, flow rate, concentration and the like. The vector of settings 306 provides desirable ideal settings for the vector of inputs 304. Some of the input variables have associated settings from the vector of settings 306, however some other of the input variables may not. Typical exemplary settings include fixing a gas flow at 20 sccm. Additionally, input variables can be subject to constraints (a subset of the acceptance criteria 310) involving other settings and input variables such as maintaining a concentration ratio of 4 unless the flow rate exceeds 12 sccm and then maintaining the concentration ratio at 20. The vector of outputs 308 includes a number of outputs, which are predictions or referred to as predicted outputs. Outputs can include, but are not restricted to, process control directives, process recipe adjustments, alarms/notifications, or other directives transmitted to machines or man-machine interfaces. Respective outputs are typically a function of one or more of the input variables and corresponding settings. The outputs are functionally related to the input variables and settings, thus the vector of outputs 308 is functionally related to the vector of inputs 304 and the vector of settings 306. Additionally, the control model description 302 can include other information such as desirable or goal ranges, training data, scalar constraints and the like. The functional relationships, goals, and other limitations and constraints are embodied in the vector of acceptance criteria 310.

Typically, predictive control models are solved to determine a vector of input values for vector 304 values that are predicted to produce desired values for the vector of outputs 308. Adaptive models allow the actual output values (as contrasted with predicted output values) to be fed back to the system as inputs. Feed back inputs are then used to adjust or fine-tune the performance (accuracy, reliability, etc.) of the control model. Alternatively, such information can be made available to the system as additional (and ongoing) training data to improve the control model. Settings, goals and constraints as well as their functional relationships can be modified so that the control model 300 can provide more accurate predictions of outputs. An exemplar (linear) control model that predicts Output$_1$ can be represented as:

$$\text{Output}_1 = k_1 v_1 + k_2 v_2 + k_3 v_3 + \ldots + k_n v_n + K$$

where, $v_1, v_2, v_3, \ldots v_n$ are input variables, $k_1, k_2, k_3, \ldots k_n$ are numeric coefficients, K is a numeric constant, and Output$_1$ is a predicted output for the model.

Furthermore, goal function(s) can be derived from the model 300 that reduce or increase certain desirable characteristics. The goal function(s) can then be solved to reduce undesired effects (e.g., variations across a wafer surface) and increase desired effects resulting in an overall improvement to the fabrication process. An exemplary goal may be that that Output$_1$ be maintained in the closed interval [10,12]. An exemplary constraint may be that the ratio of $v_1/v_2$ must be 1. Note that the model mentioned above is strictly used as an example. The present invention is applicable to more complex (e.g., non-linear) models.

Figure 4:
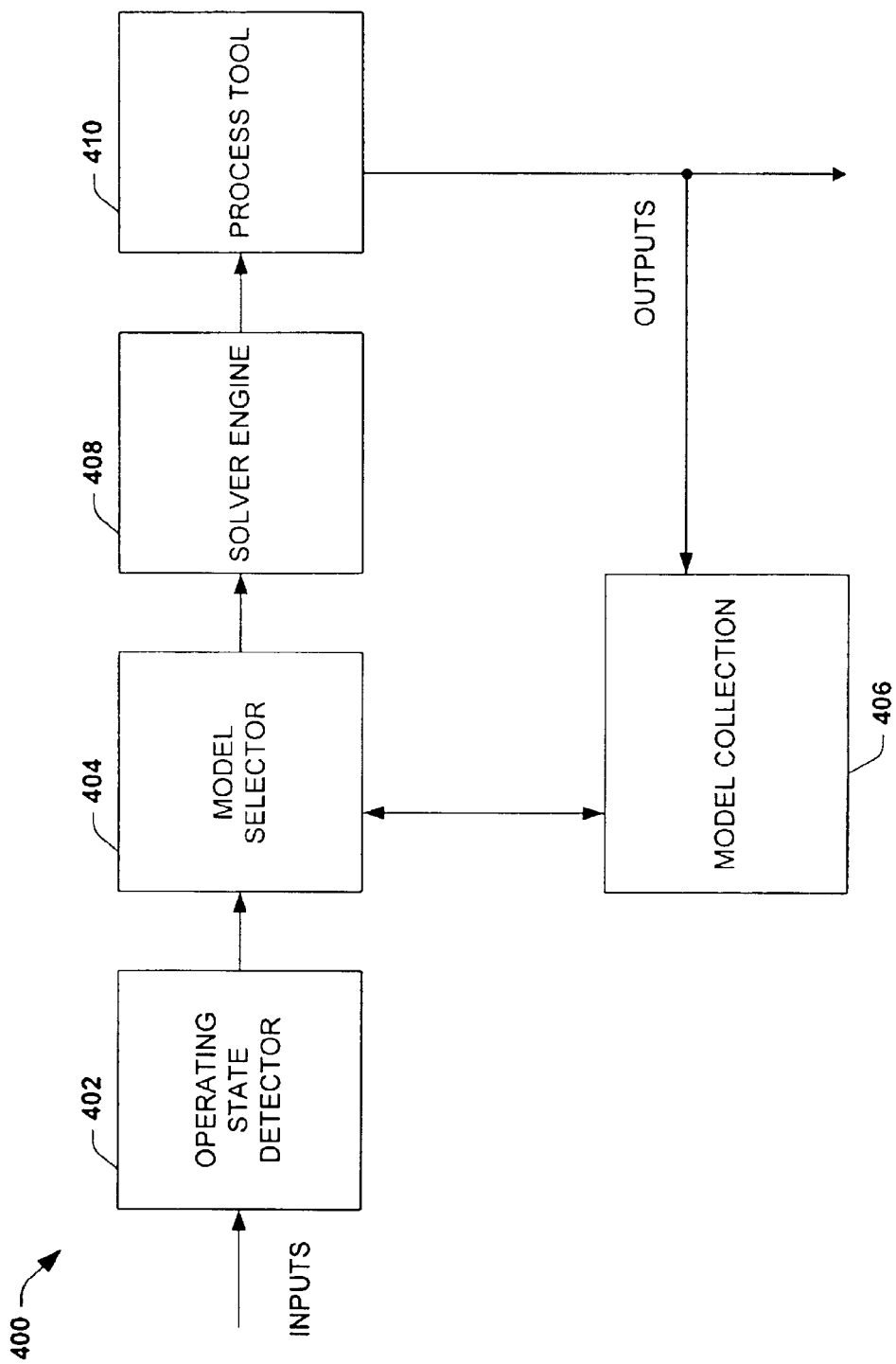
FIG. 4 is a block diagram illustrating a control system in accordance with an aspect of the invention.

FIG. 4 is a block diagram illustrating a control system 400 that facilitates semiconductor fabrication. The system 400 can be employed for any number or type of suitable fabrication process. Additionally, the system 400 can perform and/or control fabrication processes with little or no direct human intervention (e.g., without requiring operators in a clean room). The system 400 includes an operating state detector 402, a model selector 404, a model collection 406, a solver engine 408 and a process tool 410. The system 400 facilitates improved control of fabrication processes by employing the solver engine 408 that utilizes a set-point heuristic to obtain control model based solutions. The system 400 can substantially automate all or a portion of a semiconductor fabrication processes for a semiconductor device (e.g., on a wafer) by automatically detecting and controlling the various processes. Additionally, the system 400 employs feed back and feed forward techniques to further improve fabrication processes performed by the system 400.

A model is said to be instantiated when what each model variable represents is explicitly specified (e.g. a variable representing "inert gas flow" is bound to "He gas flow, in sccm"), and each model constant (e.g. $k_3$) is assigned a numeric value. A given instance of a model is associated with a particular etch recipe (program for the etcher) and etcher chamber type (e.g. AMAT Centura 5200 MxP) or specific chamber.

The solver engine 408 is implemented in a manner substantially similar to system 100 of FIG. 1. Therefore, a detailed discussion of the solver engine 408 is omitted here for brevity. However, it is appreciated that variations of system 100 of FIG. 1 can be employed and still be in accordance with the present invention. The operating state detector 402 is operative to receive inputs, which include processing parameter values, conditions and sensor data. The operating state detector 402 can determine and detect when various stages of the fabrication process have been completed or initiated. For example, the operating state detector 402 can identify the completion of an anti reflective coating operation and detect and/or initiate a start of a developing stage. Additionally, the operating state detector 402 is able to receive measurement information from a currently operating fabrication process. The operating state detector 402 generates operating state information that includes current stage or processing stage information and measurements.

The model selector 404 receives current state information from the operating state detector 402 and then the model selector 404 analyzes this information to obtain a suitable instantiated model i for a current operating state. This current operating state includes, for example, desired processing parameters and/or characteristics. Based on the analysis of the current operating state, the model selector 404 interfaces with the model collection 406 and identifies a suitable, instantiated model from the model collection 406. Subsequently, the suitable, instantiated model or model description is retrieved from the model collection 406 and provided to the solver engine 408. The model description includes information such as input variables or parameters settings corresponding to those parameters and outputs that are functionally based on the inputs and settings. Additionally the model description includes constraints on the settings and goals for processing based on the variables of the model. The model collection 406 maintains a library or collection of instantiated control models. The control models can be applicable to various types of semiconductor devices and/or various stages of processing. Additionally, the model collection 406 is further operative to receive feedback information that can then be employed to modify/update corresponding control models (e.g., models to which the feedback information is directed). Furthermore, the model collection 406 can suggest particular models for different devices and/or stages of fabrication (e.g., damascene process, gate etch process, layering, patterning and the like). Further, the model collection 406 is able to suggest an alternate control model for a given stage based on feedback information received (e.g., feedback information indicating that a currently employed control model is not properly forecasting process results and suggesting a more appropriate control model).

Referring once again to the solver engine 408, the model description is received from the model selector 404. The solver engine 408 then obtains the recipe set-point for the current fabrication process and the model description (e.g., current control model being employed). In some instances, the model description can include a recipe set-point. Alternately, the recipe set-point can be provided from semiconductor fabrication design procedures. The recipe set-point is a state of processing conditions that fabrication designers tend to believe is likely to produce desired results for the current fabrication process or stage. These conditions are typically favorable to the current stage of fabrication and mitigate damaging semiconductor devices being fabricated. Thus, it is desirable that actual processing conditions be somewhat close to this recipe set-point. However, it is appreciated that improved results can be achieved by further analyzing the model description (e.g., current control model) to obtain more suitable processing conditions or settings, especially when larger numbers of inputs, settings and outputs are present (e.g., greater than 2).

The solution (e.g., processing directives and/or parameter values) is then generated by obtaining or determining functional relationships between the inputs, outputs and settings of the model description. It is appreciated that the model may provide or indicate the functional relationships. Subsequently, the functional relationship can be further modified by constraints and/or goals (e.g., pressure less than 20 but better if 15). Finally, a solution is obtained by employing a set-point heuristic that identifies a suitable solution (e.g., processing directives including suggested settings) that is somewhat close to the recipe set-point. Other aspects of the invention can utilize other suitable heuristics.

The process tool 410 receives the suitable solution from the solver engine 408 and asserts the necessary control outputs, which are utilized for controlling the current fabrication process. The process tool 410 can also be referred to as a process controller that is responsible for initiating and controlling the current stage of fabrication. For example, the process tool 410 can initiate deposit operation of antireflective coating for a selected duration with and according to other processing parameters or conditions such as flow rate, concentration, duration, composition of deposit materials, pressure, temperature and the like. The act of deposition itself being carried out by some other tool connected to the process controller tool.

Figure 5:
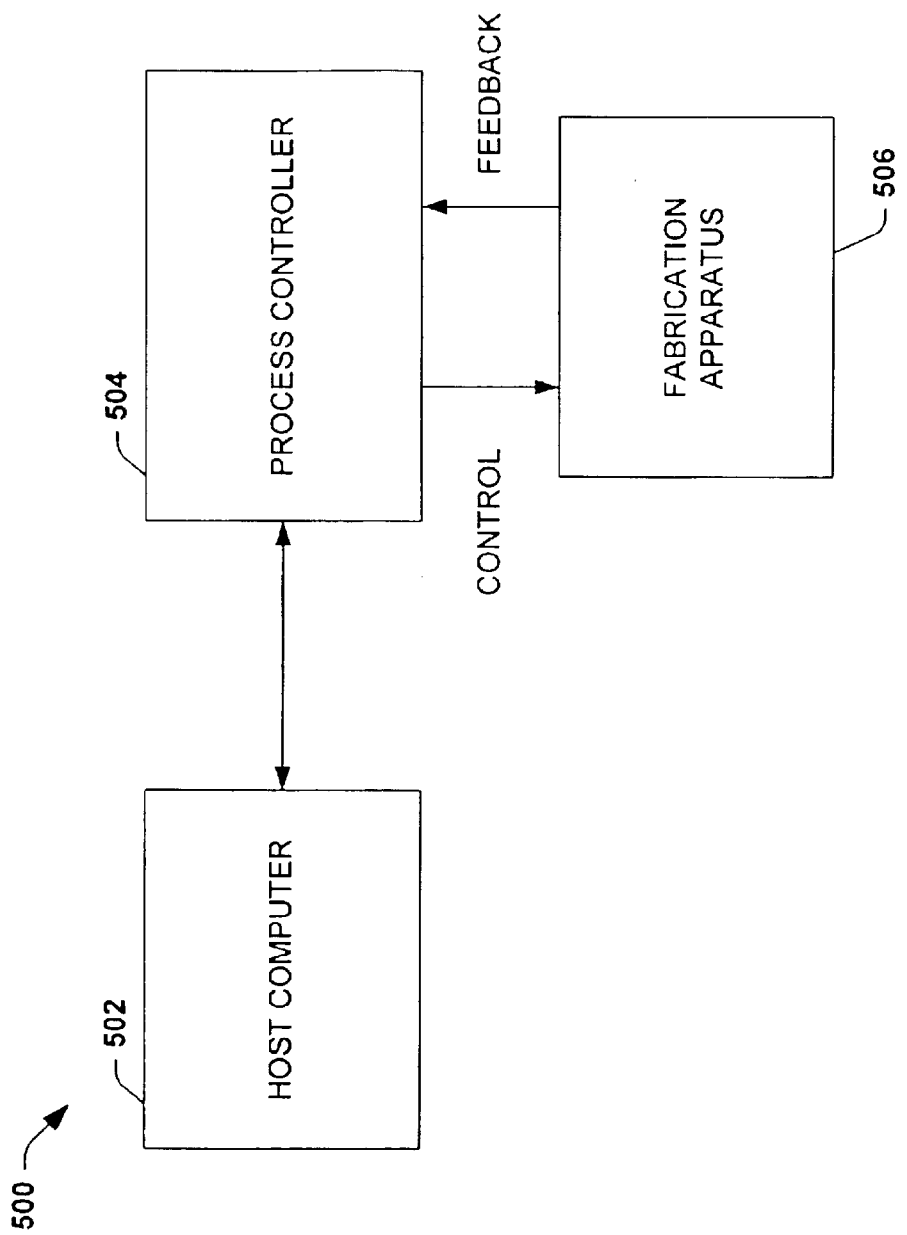
FIG. 5 is a block diagram illustrating another control system in accordance with an aspect of the invention.

Turning now to FIG. 5, a system 500 that performs semiconductor fabrication in accordance with an aspect of the present invention is depicted. The system 500 is described at a high level for illustrative purposes. The system 500 includes a host computer 502, a process controller 504 and a fabrication apparatus 506. The system 500 is operative to perform stage(s) of fabrication at least partly or substantially automatically.

The host computer 502 interfaces with the process controller 504. The host computer is operative to modify processing parameters and operation housed in the process controller. The host computer 502 can, for example, add additional control models, modify control models and update operations performed by the process controller 504. The host computer 502 can initiate a series of fabrication stages by interfacing with the process controller 504 (e.g., sending directives such as, start an etching process according to these parameters). The host computer 502 and the process controller 504 can be connected or interfaced via a network connection. Thus, the host computer 502 can be located in a separate geographic location from the process controller 504.

The process controller 504 receives directives or commands from the host computer 502 and, based on those directives, controls the desired fabrication process by appropriately asserting control directives to the fabrication apparatus 506. Generally, the process controller 504 utilizes a suitable control model and obtains a suitable solution utilizing a set-point heuristic. The process controller 504 can be implemented in accordance with the present invention by utilizing a system such as system 400 in FIG. 4. For brevity, further discussion of the process controller 504 is omitted.

Returning to FIG. 5, the fabrication apparatus 506 is a controllable mechanism that physically performs one or more fabrication processes. The fabrication apparatus 506 can, for example, perform depositing of layers, developing, annealing, etching and the like (e.g., via an etch process tool). Additionally, the fabrication apparatus 506 can include measuring components that can measure and/or detect various fabrication characteristics and dimensions. For example, the measuring components can measure static charge buildup, layer thickness, layout and critical dimensions. This information can then be reported to the process controller 504 to be incorporated to direct suitable changes in the current fabrication stage.

Figure 6:
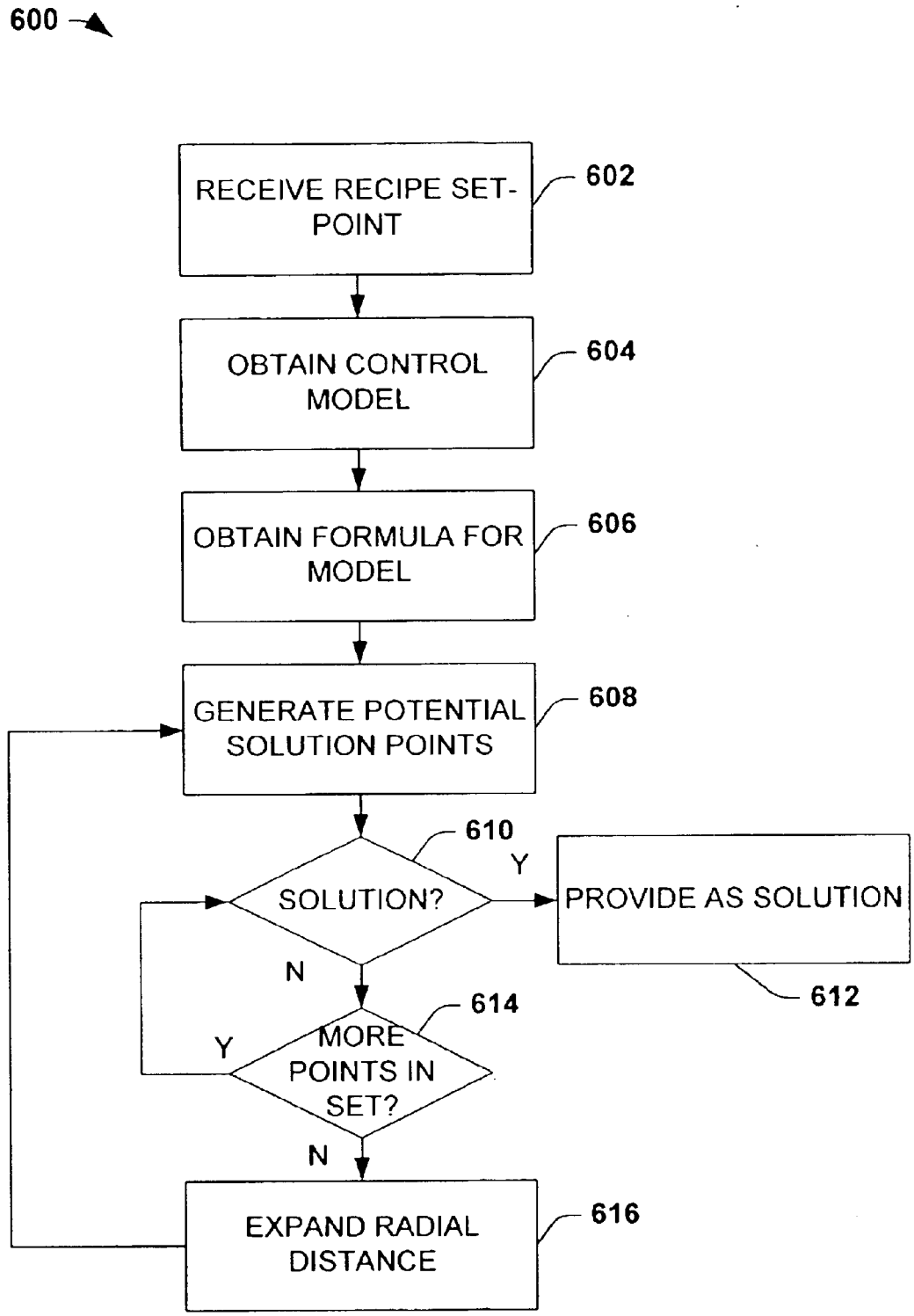
FIG. 6 is a flow diagram illustrating a method that facilitates generation of processing parameters in accordance with an aspect of the invention.
Figure 7:
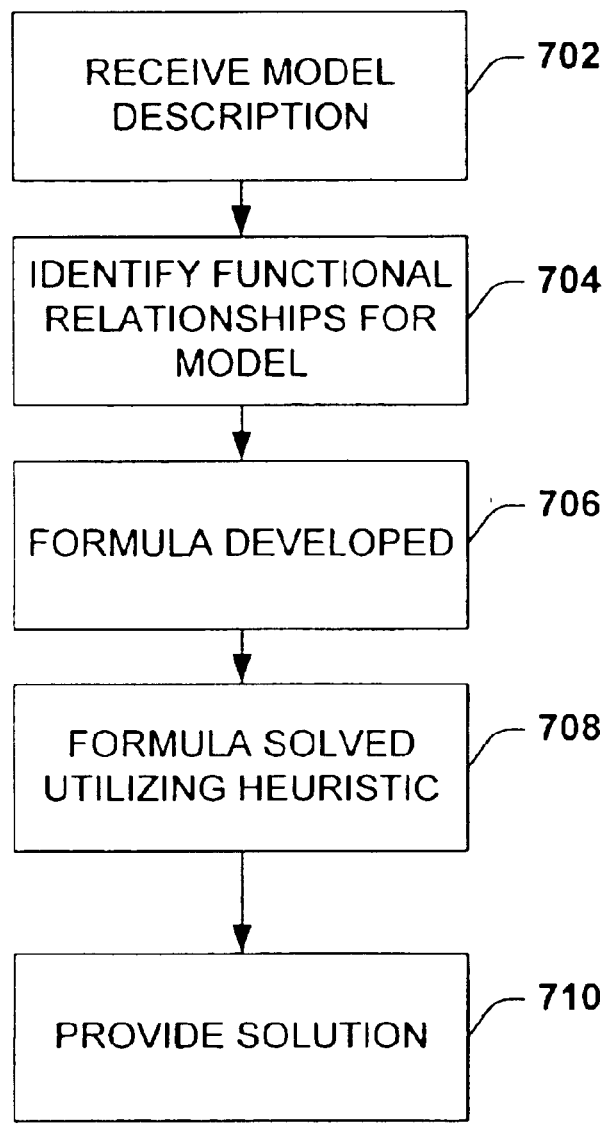
FIG. 7 is a flow diagram illustrating a method that generates control information for a fabrication process in accordance with an aspect of the invention.
Figure 8:
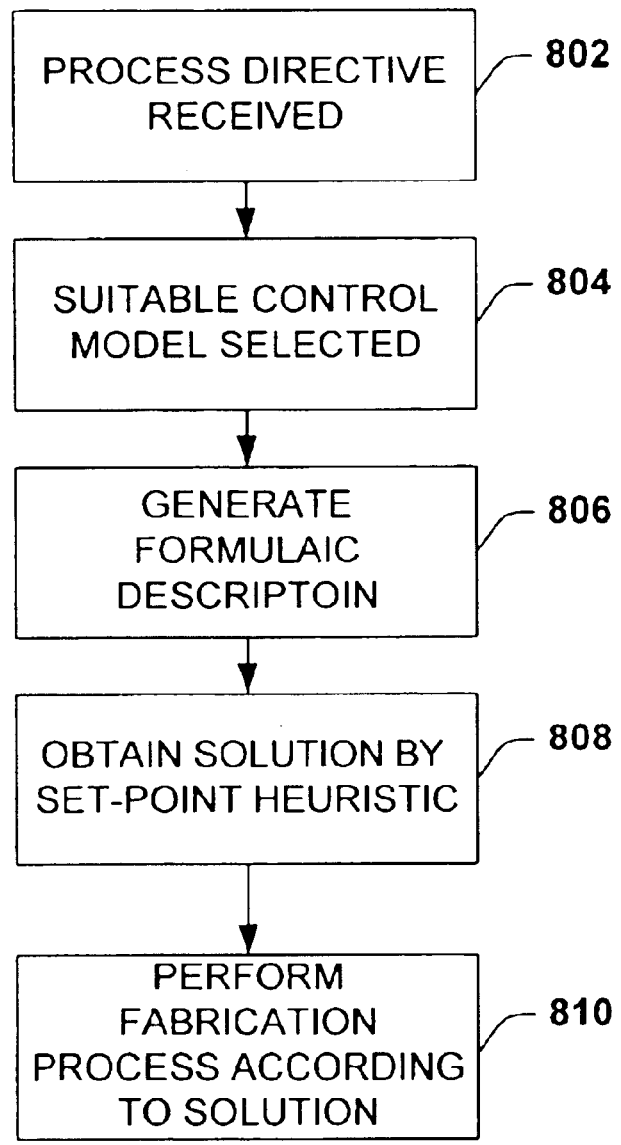
FIG. 8 is a flow diagram illustrating a method that facilitates semiconductor fabrication in accordance with an aspect of the invention.

In view of the foregoing structural and functional features described above, methodologies in accordance with various aspects of the present invention will be better appreciated with reference to FIGS. 6–8. While, for purposes of simplicity of explanation, the methodologies of FIGS. 6–8 are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 6 is a flow diagram illustrating a method 600 that facilitates computation of processing parameters in accordance with an aspect of the present invention. The processing parameters can be utilized in a fabrication process or on-going fabrication process. The method 600 generates a suitable solution that is relatively close to a provided recipe set-point. The method can be employed by a fabrication system to reduce variations in the process output.

The method 600 begins at 602 wherein a recipe set-point is received. The recipe set-point, as described above, is a set of ideal or recommended processing conditions. Then, an appropriate control model that can be used for predicting information about a semiconductor device and/or processing stage is obtained at 604. The control model can also include the recipe set-point received above. The control model includes input variables or parameters, settings for those variables or parameters and outputs (e.g., predicted outputs) based at least partly on the inputs and settings. Additionally, the control model includes constraints and goals for the processing stage. Furthermore, the control model can be derived from a number of control models. Based on the control model, the method 600 then parameterizes the control model to obtain one or more formulaic descriptions (e.g., formula(s)) for the processing stage at 606. The descriptions include the constraints and goals for the variables and settings.

The method 600 then continues with obtaining a solution for the one or more formulaic descriptions from above by the following heuristic. A set of potential solution points is generated according to a radial distance at 608. Initially, the set of potential solution points is simply the recipe set-point (e.g., a radial distance of 0). Subsequently, the set of potential solution points is obtained by extending an incremental distance away from the recipe set-point and adding substantially all of the points within that radius to the set of potential solution points. Then, the set of potential solution points are processed individually, in order, to determine if they satisfy the acceptance criteria (e.g., a goal state and constraints). The acceptance criteria encode the desired output; any potential solution point satisfying the criteria is a solution. The set of potential solution points can be ordered by distance from the recipe set-point so that closer solution points are processed first. A current solution point of the set of possible solution points is analyzed at 610 to determine if it is a solution. If the current solution point is a solution, the method 600 continues at 612 wherein the current solution point is provided as the solution. Otherwise, the method 600 determines whether there are any remaining points in the set of solution points at 614. If not, the method 600 continues at 616 where the radial distance is expanded or incremented to generate a larger set of potential solution points at 608. In alternate aspects, the radial distance is modified (e.g., incremented or decremented) to generate a set of potential solution points. If there are remaining points in the set of solution points, a next possible point replaces the current possible solution point is analyzed at 610 to determine if it is a solution. The algorithm can be terminated for unsolvable models by fixing the maximal radial distance or by amount of computation time.

Turning now to FIG. 7, a flow diagram of a method 700 that generates control information for a fabrication process in accordance with an aspect of the present invention is depicted. The method 700 facilitates obtaining processing parameters for a particular device and/or stage of semiconductor fabrication. The method 700 operates on a control model or model description to instantiate a suitable model, generate a formulaic description, and solve that description to obtain a suitable solution.

The method 700 begins with receiving a model description at 702. The model description, also referred to as a control model, includes model variables (e.g., input and output variables), settings (for some of the model input variables), model constraints (e.g., required processing conditions), model goals (e.g., suggested processing conditions), predicted outputs and the like. The model description can be comprised of or derived from one or more control models that relate to a desired fabrication process.

The model description is then analyzed to identify functional relationships and interrelations at 704. As stated above, the respective outputs are functionally related to one or more inputs and corresponding settings for the one or more inputs. Additionally, the respective outputs can be subject to constraints that create dependencies among them. For example, a constraint that requires a fixed slope would compel a vertical etch rate (an example output) to be equal to the fixed slope times the horizontal etch rate (another example output. That is, such a constraint would create a mathematical dependency of one output upon another.

After being analyzed, formulas or a formulaic description are developed that are proper with respect to the model description at 706. The formula(s) are then solved at 708 by employing a set-point heuristic that finds a suitable solution point that is significantly close in distance to a recipe set-point that meets the goals and constraints. Essentially, the set-point heuristic starts with a recipe set-point and gradually expands radialy from the recipe set-point to identify a suitable solution point that is relatively close distance wise to the recipe set-point. Once solved, the suitable solution point (e.g., approximate solution point) can be provided at 710 to a fabrication apparatus or system in order to perform the desired fabrication process. Additionally, the method 700 is equally applicable to be utilized to obtain a solution point for an ongoing fabrication process. Further, the method 700 can be repeatedly invoked during a fabrication process with the model description adjusted based on feedback information (e.g., actual measurements) of the ongoing process.

FIG. 8 is a flow diagram depicting a method 800 that facilitates semiconductor fabrication in accordance with an aspect of the present invention. The method 800 receives directives or commands and performs and controls at least a portion of a semiconductor device fabrication process. The method 800 is operable without requiring substantial manual interaction. Additionally, the method 800 can be initiated and controlled remotely from a fabrication system.

The method 800 begins at 802, where a directive and/or commands for performing a fabrication process is/are received. The directive includes information such as, but not limited to, semiconductor device being fabricated, stage of fabrication, process operation, recommended process conditions (e.g., recipe set-point) and the like. Based on this directive, a suitable control model is selected from a collection of control models at 804. The suitable control model defines process variables, parameters, settings and the like and is selected such that it appropriately predicts desired results (e.g., outputs) according to the model for the fabrication process to be performed. Additionally, the suitable control model can be derived from one or more control models related to the fabrication process. Subsequent to selection of the suitable control model, a formulaic description or formula is generated based on the control model and the fabrication process to be performed at 806. The formulaic description relates desired results or outputs to the processing parameters, the process settings and conditions.

The method continues at 808, where a solution for the formulaic description is obtained by utilizing a set-point heuristic. The heuristic obtains the solution relatively or substantially close to the recipe set-point. The solution is then employed at 810 to perform the desired fabrication process. Feedback from the fabrication process can be collected and utilized to update/modify the suitable control model and further improve the fabrication process.

Figure 9:
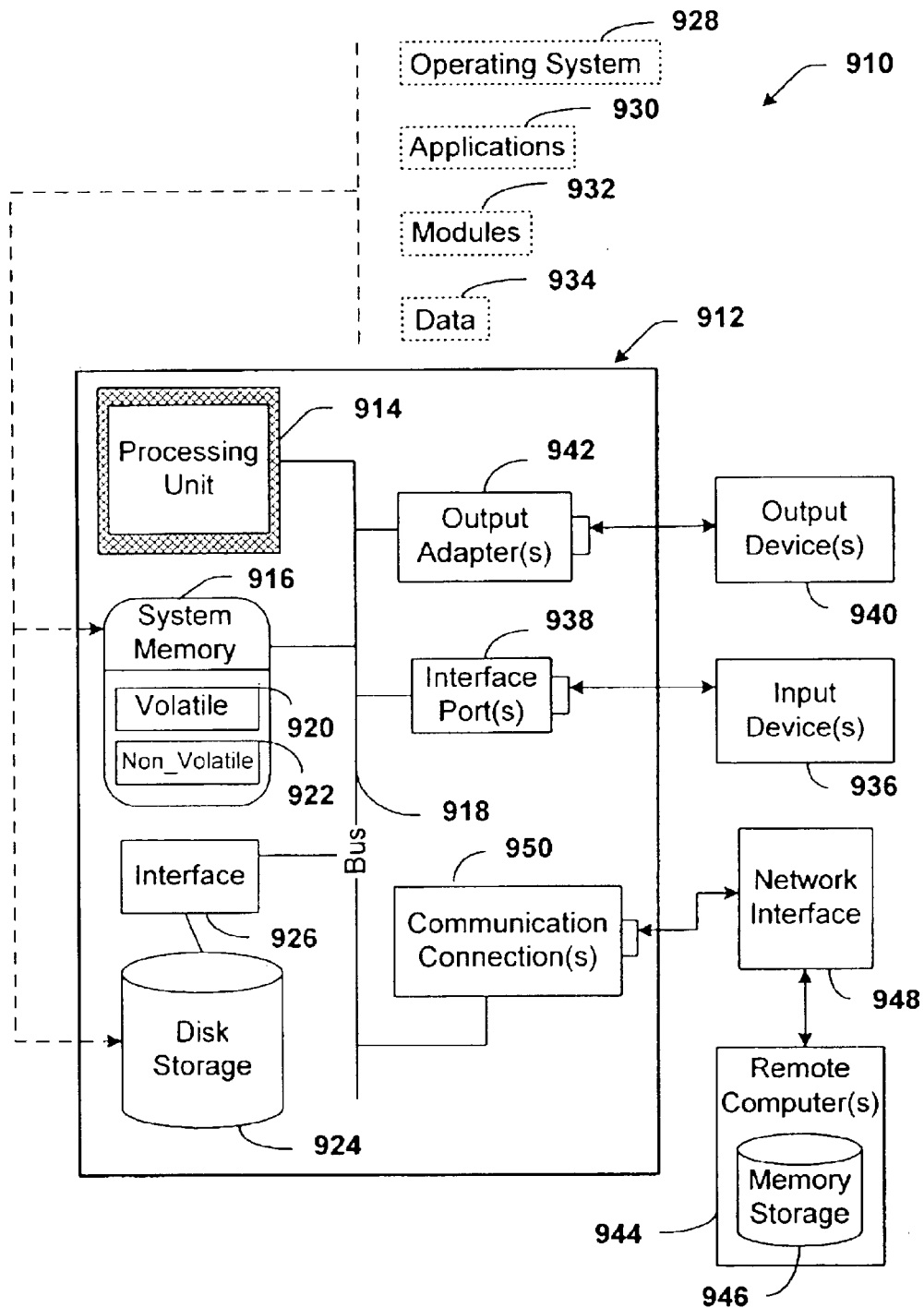
FIG. 9 is a schematic block diagram of an exemplary operating environment for a system configured in accordance with the present invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or nonremovable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be understood that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, sound card, digital camera, digital video camera, web camera, and the like. These and other input devices connect to the processing unit 914 through the system bus 918 via interface port(s) 938. Interface port(s) 938 include, for example, a serial port, a parallel port, a game port, a universal serial bus (USB), and a 1394 bus. Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
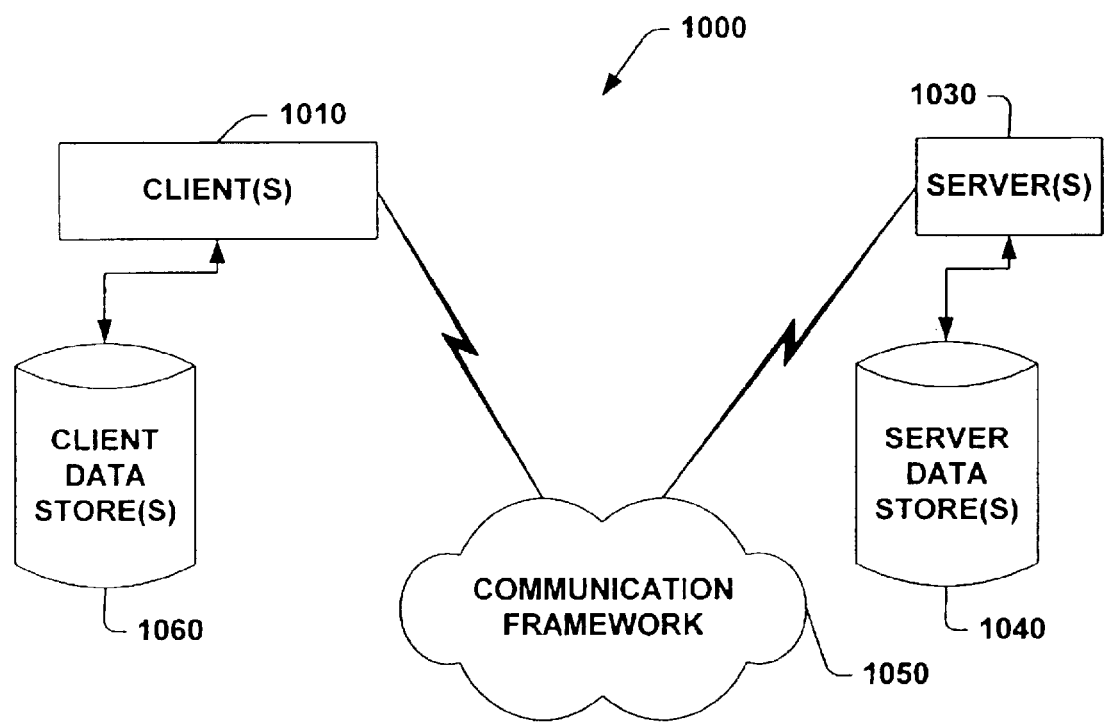
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates identifying model solutions comprising:
   a model description that includes model variables, model settings, model constraints and model goals;
   a paramatizer that obtains a formulaic description for the model description and a desired semiconductor fabrication process; and
   a control algorithm that employs a set-point heuristic to obtain a solution for the desired semiconductor fabrication process based on the model description and the formulaic description; and
   a recipe set-point and the solution being relatively close distance wise to the recipe set-point.

2. The system of claim 1, the model description further comprising model outputs, the model outputs being predictions based on the input variables and the model settings.

3. The system of claim 1, the input variables comprising at least one selected from the group comprising flow rate, pressure, time, power, concentration and temperature.

4. The system of claim 1, the formulaic description being non-linear.

5. The system of claim 4, the solution for non-linear models being an approximate solution to the formulaic description and obtained at a reasonably low computational cost.

6. The system of claim 1, the set-point heuristic operable to enlarge a set of possible solutions by increasing a radius and to identify the solution from the set of potential solutions.

7. The system of claim 1, the paramatizer operative to obtain a minimum value, a maximum value, an initial value and a precision by which a corresponding input variable can be modified.

8. The system of claim 1, the paramatizer operative to translate model descriptions including model variables, model outputs, formulas, operations into an internal representation suitable for processing.

9. The system of claim 1, further comprising a function(s) that determines precision of the model variables.

10. The system of claim 9, the function(s) being user supplied function(s).

11. The system of claim 1, one or more of the model variables being only incrementable.

12. The system of claim 1, one or more of the model variables being only decrementable.

13. A system that provides control model solutions comprising:
    a radius control component that adaptively generates a locus of possible solution points having a radial distance from a recipe set-point;
    a distance component that computes distance(s) among the locus of possible solution points and the recipe set-point; and
    a solution checker that validates a solution from the locus of possible solution points, the solution satisfying one or more goal conditions, applicable constraints, and having a relatively small computed distance from the recipe set-point.

14. The system of claim 13, the solution checker utilizing a hill climbing weak algorithm.

15. The system of claim 13, the solution finder operative to utilize a set-point heuristic.

16. The system of claim 13 the radius control component being operated automatically to narrow and widen the locus of potential solution points.

17. The system of claim 13, further comprising an ideal state that represents the recipe set-point and suggested processing conditions, a subsequent state that maintains a state for a current possible solution point and a goal state that identifies desired process requirements.

18. The system of claim 13, further comprising a mechanism to represent an ordered set of subsequent next states where each state represents a potential solution.

19. The system of claim 18, the mechanism further comprises the ability to expand or limit the set of available operators thereby restricting or expanding the number of successor states.

20. A method that facilitates computation of processing parameters comprising:
    receiving a recipe set-point;
    obtaining an appropriate control model that includes input variables, settings for the input variables, constraints on the settings, process outputs and goal outputs;
    generating a formulaic description of the control model;
    generating a set of possible solutions to the formulaic description; and
    respectively analyzing the set of possible solutions to identify a suitable solution that substantially meets the goal outputs of the control model and that is substantially close to the recipe set-point; and
    computing distances from the recipe set-point for the set of possible solutions.

21. The method of claim 20, further comprising ordering the set of possible solutions such that closer solutions are processed first.

22. The method of claim 20, the set of possible solutions is generated by radialy expanding from the recipe set-point.

23. The method of claim 20, the recipe set-point indicating ideal processing conditions.

24. The method of claim 20, further comprising expanding a radial distance from the recipe set-point to obtain additional possible solution points to obtain the suitable solution.

* * * * *